(12) United States Patent
Raubuch

(10) Patent No.: US 8,364,934 B2
(45) Date of Patent: Jan. 29, 2013

(54) MICROPROCESSOR AND METHOD FOR REGISTER ADDRESSING THEREIN

(75) Inventor: Martin Raubuch, Baldham (DE)

(73) Assignee: Freescale Semiconductor, Inc., Austin, TX (US)

( * ) Notice: Subject to any disclaimer, the term of this patent is extended or adjusted under 35 U.S.C. 154(b) by 433 days.

(21) Appl. No.: 12/305,114

(22) PCT Filed: Jul. 11, 2006

(86) PCT No.: PCT/EP2006/064116
§ 371 (c)(1),
(2), (4) Date: Dec. 16, 2008

(87) PCT Pub. No.: WO2008/006400
PCT Pub. Date: Jan. 17, 2008

(65) Prior Publication Data
US 2009/0204754 A1    Aug. 13, 2009

(51) Int. Cl.
*G06F 12/00* (2006.01)
(52) U.S. Cl. .......... 711/214; 711/200; 712/210
(58) Field of Classification Search .......... 711/214, 711/200; 712/210
See application file for complete search history.

(56) References Cited

U.S. PATENT DOCUMENTS

| | | | |
|---|---|---|---|
| 5,307,502 A * | 4/1994 | Watanabe et al. | 712/41 |
| 6,219,779 B1 * | 4/2001 | Takayama et al. | 712/210 |
| 6,484,253 B1 * | 11/2002 | Matsuo | 712/212 |
| 2003/0188130 A1 * | 10/2003 | Henry et al. | 712/209 |
| 2004/0243788 A1 * | 12/2004 | Isomura | 712/4 |
| 2004/0255099 A1 * | 12/2004 | Kromer | 712/219 |
| 2005/0223136 A1 * | 10/2005 | Tanaka et al. | 710/22 |
| 2005/0226337 A1 * | 10/2005 | Dorojevets et al. | 375/240.24 |
| 2009/0307469 A1 | 12/2009 | Wolrich et al. | |

FOREIGN PATENT DOCUMENTS

| | | |
|---|---|---|
| EP | 0509558 B1 | 10/1992 |
| EP | 0747834 B1 | 3/2005 |
| WO | 03081422 A1 | 3/2003 |

OTHER PUBLICATIONS

Drimak, E.G. "Vector Addressing Hardware Assist"; IBM Technical Disclosure Bulletin XP-002128559; vol. 25, No. 5; Oct. 1982; 3 pages, IBM, New York.
PCT /EP2006/064113 International Search Report and Written Opinion mailed Nov. 7, 2006.

* cited by examiner

*Primary Examiner* — Hashem Farrokh

(57) ABSTRACT

A microprocessor architecture comprising a microprocessor operably coupled to a plurality of registers and arranged to execute at least one instruction. The microprocessor is arranged to determine a class of data operand. The at least one instruction comprises one or more codes in a register specifier that indicates whether relative addressing or absolute addressing is used in accessing a register. In this manner, absolute and relative register addressing is supported within a single instruction word.

20 Claims, 3 Drawing Sheets

MICROPROCESSOR AND METHOD FOR REGISTER ADDRESSING THEREIN

FIELD OF THE INVENTION

The present invention relates to a microprocessor architecture and, in particular, a mechanism for register addressing in the microprocessor. The invention is applicable to, but not limited to, a mechanism for supporting both absolute and relative register addressing.

BACKGROUND OF THE INVENTION

A microprocessor (sometimes abbreviated as µp) is a digital electronic component with miniaturized transistors on a single semiconductor integrated circuit (IC). One or more microprocessors typically serve as a central processing unit (CPU) in a computer system or, more recently, in a handheld communication or computing device. Microprocessors are widely used with data registers and memory elements, to enable program code running on the microprocessor to access data contained therein. In order to access data contained within the register or memory element, each register/element is allocated a unique address.

One of the most important applications for addressing a data element in a microprocessor architecture is to process lists or arrays of data in a loop, where each pass of the loop uses a different set of stored data. The benefit of such loops is that the same section of program code, that is code within the loop, can be used to process the different data sets.

Data operands in microprocessor architectures are contained either in one or more microprocessor registers or in memories that can be accessed by the microprocessor. Most microprocessors have variants of indirect addressing with an auto-increment and/or decrement function. However, the microprocessor typically also has a variant with no change of the indirect address. It is, of course, the auto-increment/decrement modes, that are most useful for arrays-of-data processing in loops. Indirect addressing means, that the data operand address is contained in a register of the processor, typically called an address or pointer register.

However, it is known that in order to access a central processing unit's (CPU) internal registers an absolute identification (in, say, the form of one or more of a register number, name, etc.) must be specified. Such absolute identifications are contained in instruction words. With absolute addressing, program parts that perform the same operation on multiple data objects can not be implemented as program loops. Loops need to be unrolled, which leads to higher instruction memory space requirements. Unrolling a loop means that the inner code of the loop is replicated (copied) for each iteration of the loop. In microprocessor architectures, where only absolute register addressing is available, it is not possible to implement program loops that access different registers in each pass of the loop.

Furthermore, if the different data sets are not contained in memory, but are contained in the processor's registers, the loop concept can not be used, as most microprocessor architectures do not employ indirect addressing capability for their 'internal' registers.

In particular, modern reduced instruction set code (RISC) processors and digital signal processors (DSPs) have large arrays of general purpose registers. Many algorithms are able to benefit from the ability to process lists or arrays of operands in the processor's registers by means of loops.

However, with absolute register addressing only, the code segment has to be duplicated for each set of operands, which results in poorer code density and more complex software development.

A possible solution would be to add indirect addressing, as with memory operands, for the internal registers of the processor. However, this would require address/pointer registers that point to general purpose registers in the main register list or array. Furthermore, these extra address/pointer registers would invariably complicate the processor's programming model and tools.

Thus, a need exists for an improved microprocessor architecture and method for addressing therein.

SUMMARY OF THE INVENTION

In accordance with aspects of the present invention, there is provided a microprocessor architecture, an integrated circuit and method for register addressing therein, as defined in the appended Claims.

BRIEF DESCRIPTION OF THE DRAWINGS

Exemplary embodiments of the present invention will now be described, by way of example only, with reference to the accompanying drawings, in which.

DESCRIPTION OF EMBODIMENTS OF THE INVENTION

Figure 1:
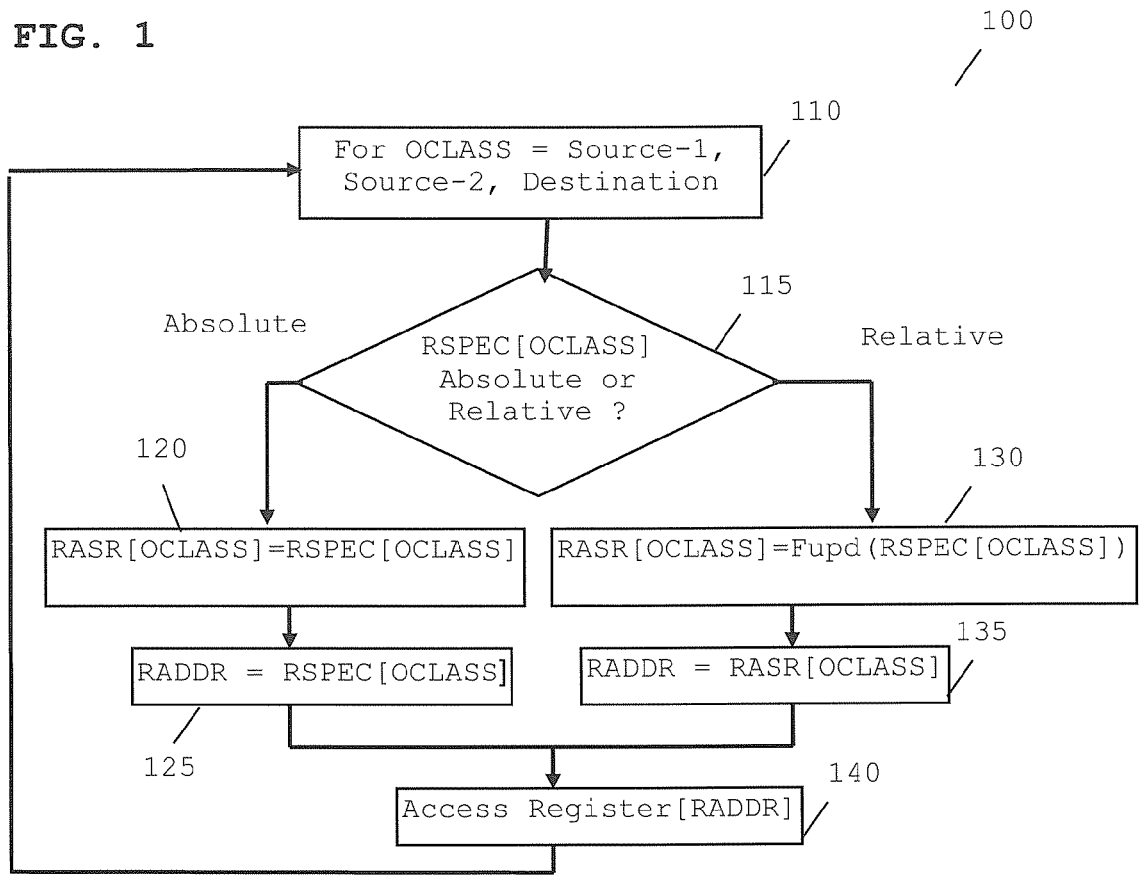
FIG. 1 illustrates a flowchart indicating relative register addressing for a microprocessor according to embodiments of the present invention.

In one embodiment of the present invention, a microprocessor architecture comprises a microprocessor operably coupled to a plurality of registers. The microprocessor executes instructions where each instruction may read at least one source operand and/or generate at least one destination data operand. The microprocessor determines a data operand class, noting that instructions have multiple data operands. Within each instruction, an opcode word comprises one or more bit fields, for example an n-bit code used in a register specifier (RSPEC), which carries an indication of whether absolute or relative addressing is used.

In one embodiment of the present invention, the opcode word may comprise a register specifier (RSPEC), which may specify a register address within a register array relative to a last address accessed. In particular, the register specifier may specify an address relative to a last address accessed for a particular class of operand. In one embodiment of the present invention, specifying an address relative to a last address accessed may comprise wrapping to a first address or a last address in the register array.

The use of the aforementioned mechanism, to support relative addressing within the microprocessor may, in one embodiment, permit a single looping code sequence to manipulate data in multiple registers. This means that loops may not need to be 'unrolled', thereby saving code space.

The aforementioned relative addressing may, in one embodiment, offer an advantage over absolute addressing in that the use of loops to process lists/arrays of register operands may improve code density.

The aforementioned mechanism, to support relative addressing within the microprocessor may, in one embodiment, enable the reduced code to be achieved by adding branches, as the branches may be 'predicted', keeping the pipeline filled and avoiding loss of performance.

The aforementioned mechanism, to support relative addressing within the microprocessor may, in one embodiment, be easy to implement by software programmers.

Thus, code size reduction may be obtained if the same code sequence is able to operate on multiple data in sequential registers. Hence, the aforementioned mechanism, to support relative addressing within the microprocessor may find particular application in digital signal processing and, in particular, image processing, where renaming of the next set of registers to allow the same code sequence to run on different registers is beneficial. In essence, software for this type of application spends a significant amount time running in loops and operand arrays are small enough to fit into a processor register file.

In one embodiment of the present invention, the class of data operand may encompass one or more of the following: source-1, source-2, destination.

In one embodiment of the present invention, an integrated circuit comprises the aforementioned microprocessor architecture.

In one embodiment of the present invention, a method for register addressing in a microprocessor architecture comprising a microprocessor operably coupled to a plurality of registers is described. The method comprises executing instructions, whereby each instruction reads at least one source operand and generates at least one destination operand and determining a class of operand. The method further comprises identifying within each instruction, an opcode word comprising one or more bit fields, for example an n-bit code used in a register specifier (RSPEC), which carries an indication of whether absolute or relative addressing is used in accessing a register of the plurality of registers.

It is envisaged that the inventive concept herein described may be embodied in any type of microprocessor that has an array of registers. The microprocessor architecture according to embodiments of the present invention advantageously utilises a smaller code store. Thus, there is a significant benefit in utilising the inventive concept especially in applications where software code is stored in on-chip resources such as flash or random access memory (RAM).

Embodiments of the present invention are applicable to any microprocessor architecture, such as digital signal processors (DSPs) or Single Instruction, Multiple Data (SIMD) processors.

In one embodiment of the present invention, only one relative addressing state register (RASR) per operand class is used. Relative addressing is implemented for an array of user registers. The RASR register is a support register, not visible in the programming model.

The microprocessor is configured to identify that absolute addressing is used when the one or more bits in the opcode field, preferably the RSPEC field, indicates a register address/number (RADDR).

Alternatively, the microprocessor is configured to identify that relative addressing is used when the one or more bits in the opcode field, preferably the RSPEC field, indicates a function Fupd to update RASR.

In the context of the present invention, relative addressing encompasses scenarios where the data operand address is generated relative to the most recently used address for the same operand class (such as source-1, source-2, destination, ...)

Referring now to FIG. 1, a flowchart 100 illustrates a process whereby relative register addressing is used in a microprocessor according to embodiments of the present invention. FIG. 1 illustrates a procedure for one instruction, where a loop is executed for each operand class of the current instruction. Although FIG. 1 illustrated in a logical form, in reality all of the operations are implemented in parallel. The microprocessor executes instructions and each instruction reads source operands and generates destination operands.

It is known that instructions of microprocessors perform operations on data operands. Data operands can be source operands, for example an input to the operation, or destination operands, for example an output of the operation.

In one embodiment of the present invention, the microprocessor is arranged to determine a class of operand received, for example one of a source-1, source-2 or destination class of operand, as shown in step 110. The microprocessor determines the data operand class, noting that instructions have multiple operands. Within each instruction, an opcode word comprises one or more bit fields, for example an n-bit code used in a register specifier (RSPEC), carries an indication of whether absolute or relative addressing is used, as shown in step 115.

In one embodiment of the present invention, the opcode word may comprise a register specifier (RSPEC), which may specify an address relative to a last address accessed. In particular, the register specifier may specify an address relative to a last address accessed for a particular class of operand. In one embodiment of the present invention, specifying an address relative to a last address accessed may comprise wrapping to a first address or a last address in the register array.

For example, one instruction may be to add values in registers R0 and R1 and place the result in register R2. This instruction has two source operands, i.e. values in R0 and R1; and one destination operand that is the value written into R2. Data operands are contained either in the microprocessor internal registers or memories/registers outside the microprocessor.

One register specifier (RSPEC) is located per class of operand (OCLASS), and this class of operand comprises a field or bit-field within the Opcode word that dictates whether absolute addressing or relative addressing is used. There is only one Opcode word per instruction, e.g. a 16-bit word or 32-bit word.

'RADDR' is a parameter to identify an index into the register array, which must not be a physical register in an implementation. 'RASR' is a physical register (one per class). A primary difference between absolute addressing and relative addressing may be understood as follows:

absolute addressing: 'RADDR' is directly determined by 'RSPEC', without looking at 'RASR' in step 125. In addition 'RASR' is assigned the same value 'RADDR' in step 120. Notably, this is not for the current instruction, it is for subsequent instructions, which potentially may use relative addressing. Therefore, it is important to determine which register was last accessed last for this operand class. This clarifies why initialization instructions (shown later in FIG. 2) are not always required. Every time absolute addressing is used for an operand class, the state register 'RASR' of that class is updated with the absolute register number 'RADDR'. A separate initialization instruction is required only, if the current state in 'RASR', for the classes where relative addressing should be used (e.g. in a loop), is not the desired start-index in the register array.

Relative addressing: 'RADDR' is determined by the content of 'RASR', as shown in step 135. Thus, it is relative to the previous 'RADDR' of this class. In addition 'RSPEC' specifies an update function for 'RASR', as illustrated in step 130. This function can be executed either before 'RADDR' is determined (as in the example) or after 'RADDR' has been determined.

Table 1 illustrates the process for each instruction of how the register indices (address/number) are generated for each class that the instruction needs.

TABLE 1

| | |
|---|---|
| OCLASS | Operand Class, three classes in the example: 1. Source-1, 2. Source-2, 3. Destination |
| RSPEC[ ] | Register Specifiers = bit fields in instruction word (opcode), one RSPEC per OCLASS |
| RASR[ ] | Relative Addressing State Registers Processor has one RASR per OCLASS |
| RADDR | Register Index = index into the register file |
| Fupd | RASR[ ] update functions, examples: RASR[OCLASS] = RASR[OCLASS] + 1 RASR[OCLASS] = RASR[OCLASS] − 1 RASR[OCLASS] no change |

Figure 2:
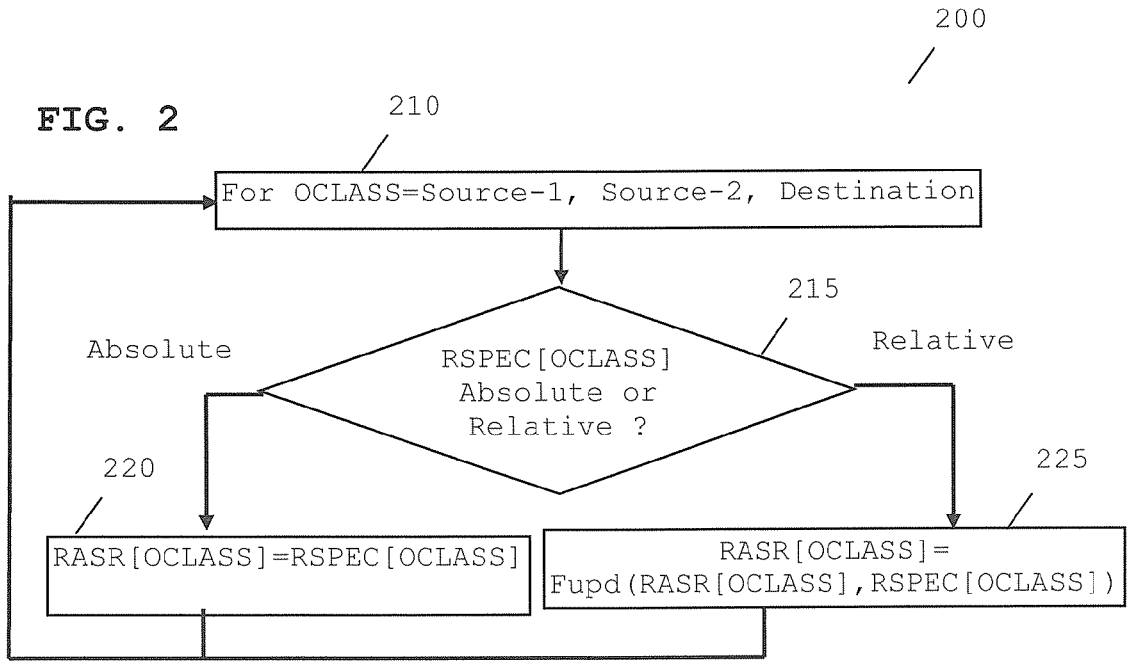
FIG. 2 illustrates a flowchart of an initialisation instruction of relative register addressing for a microprocessor according to embodiments of the present invention.

Referring now to FIG. 2, a flowchart 200 illustrates an initialisation instruction of relative register addressing for a microprocessor according to embodiments of the present invention. The microprocessor executes instructions and each instruction reads source operands and generates destination data operands.

A determination is then made as to whether the class of data operand is, for example, one of: a source-1, source-2 or destination class of operand, as shown in step 210. For these data operands in step 210, a determination of the register specifier (RSPEC) in the instruction word (Opcode) is then made, as in step 215. One RSPEC is located per class of operand (OCLASS), and this data operand class, via the Opcode word, dictates whether absolute addressing or relative addressing is used.

In effect, FIG. 2 illustrates a method equivalent to FIG. 1, but where the state register(s) RASR are initialized and the operands are not actually accessed and used.

In effect, Table 2 below illustrates a process for each instruction of how the register indices (address/number) are generated for each operand class that the instruction needs.

TABLE 2

| | |
|---|---|
| OCLASS | Operand Class, three classes in the example: 1. Source-1, 2. Source-2, 3. Destination |
| RSPEC[ ] | Register Specifiers = bit fields in instruction word (opcode), one RSPEC per OCLASS |
| RASR[ ] | Relative Addressing State Registers Processor has one RASR per OCLASS |
| Fupd | RASR[ ] update functions, examples: RASR[OCLASS] = RASR[OCLASS] + 1 RASR[OCLASS] = RASR[OCLASS] − 1 RASR[OCLASS] no change |

Figure 3:
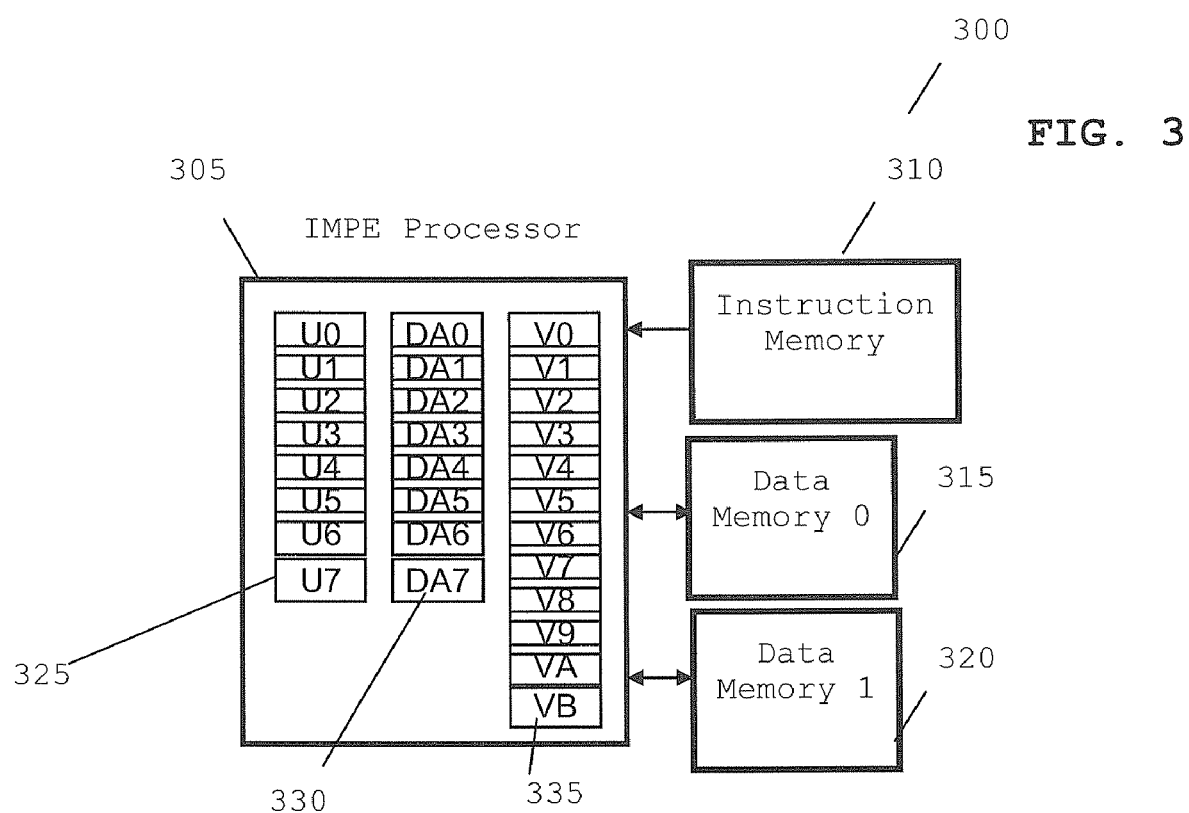
FIG. 3 illustrates a block diagram of a microprocessor architecture and associated registers supporting relative register addressing according to embodiments of the present invention.

FIG. 3 illustrates a block diagram of a microprocessor architecture 300 and associated registers supporting relative register addressing according to embodiments of the present invention. An image processing engine (IMPE) processor 305 comprises an array (U0-U7) of update (U) registers 325, an array (DA0-DA7) of data address (DA) registers 330 and an array of vector registers (V0-VB) 335. The IMPE processor 305 is operably coupled to instruction memory 310, and first data memory (0) 315 and second data memory (1) 320.

In one embodiment of the present invention, a single instruction multiple data digital signal processor (SIMD-DSP) 305 is used for pixel level image processing. The SIMD-DSP 305 comprises 12×80-bit Vector Registers V0 to VB, 8×16-bit Data Address Registers DA0 to DA7, and 8×8-bit (auto) Update Registers U0 to U7. The SIMD-DSP 305 uses Dual 64-bit Data Buses (dual memory source data operands).

In accordance with embodiments of the present invention, relative register addressing may be implemented for the twelve vector registers V0 to VB. Thus, the class of operand, via the Opcode word in a form of a 4-bit register specifier (RSPEC), determine an absolute register V0 to VB, or a relative register address that indicates, for example, the same vector (VS same), the next vector (VN next) or the previous vector (VP).

Figure 4:
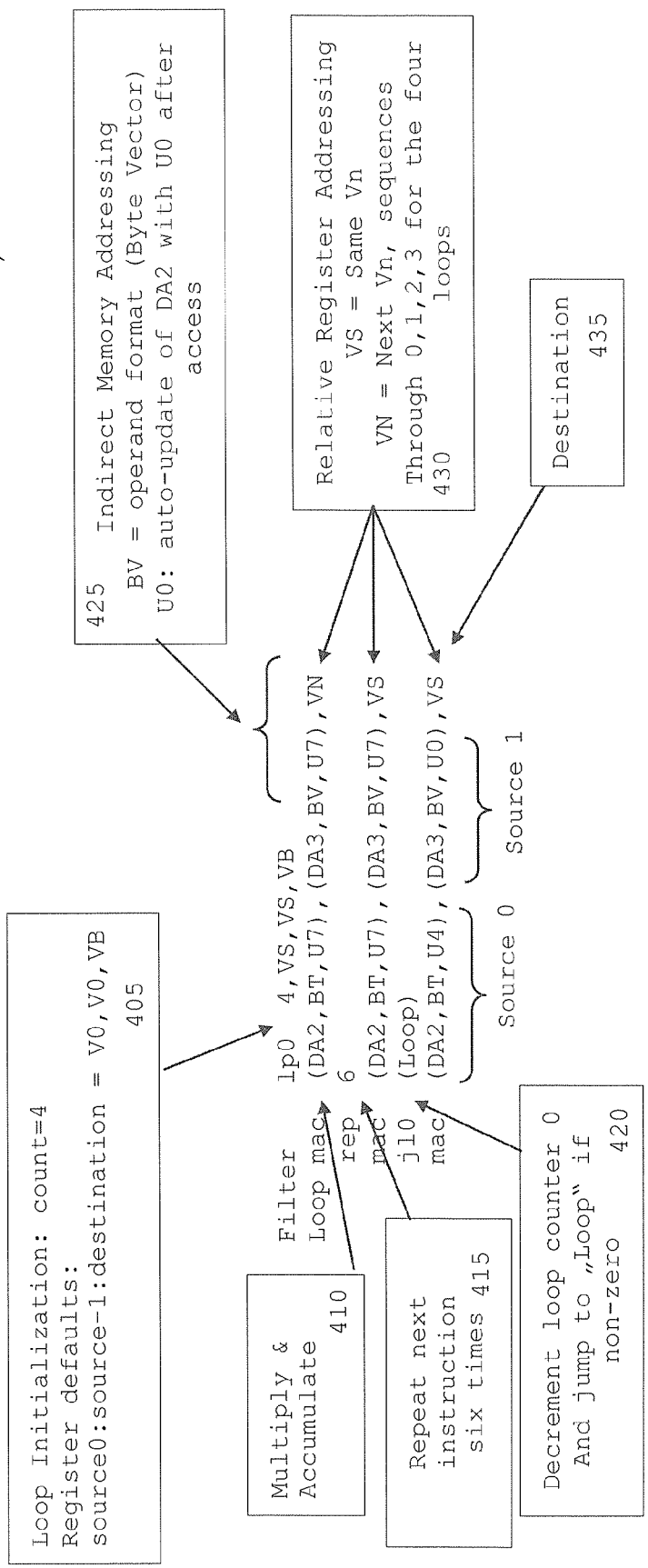
FIG. 4 illustrates example code to support relative register addressing according to embodiments of the present invention.

FIG. 4 illustrates example code 400 to support relative register addressing according to embodiments of the present invention. The example code is based on a filter with a 4×sum-of-products (i=0 to 7) calculation, using only six instructions, source operands in memory and results in registers V0 to V3. The code comprises a loop initialisation code with a count of '4' 405, with a multiply and accumulate code 410, and with a repeat next instruction 415, repeating six times. There is also a decrement the loop counter '0' and a jump instruction to the 'loop', if non-zero 420. The first source address (0) and second source address (1) comprising indirect register addressing, byte vector (operand format) and an auto-update code.

Indirect register addressing 425 is performed using the byte vector (BV) operand format, in conjunction with the auto-update of the data source type (DA*) after access.

In FIG. 4, only VB is an absolute address, where it initializes the destination register class for which relative addressing is then used with the loop. The absolute register addressing sets the default register (VS) for the next instruction for the source and destination operands. The VS for source 0/1 is a place holder, i.e. it specifies for source 0,1 in this initialising instruction. Later in the loop, indirect memory addressing is used for source 0/1, and as such the initialisation values are no longer relevant. The same Vs is used as there is no change of the state registers (RASR), thereby providing better (lower) power consumption.

Thus, the example in FIG. 4 illustrates that without employing the inventive concept herein described, the filter could not be written as a loop. The four passes of the loop generate respective results in registers V0, V1, V2 and V3. The loop-initialise instructions sets the destination register to VB, so that with the first VN (next) addressing, V0 is actually used (i.e. wrapped back from last address).

The source-0/source-1 registers are set to Vs (same) in the loop initialise instruction. A skilled artisan will appreciate that this feature is not critical, as the actual computation instructions (the three 'MAC' instructions) all use indirect memory addressing for the two source operands in memory, where relative addressing is not relevant.

The assembler operand field has the three operand specification format: source0:source1:destination. First, let us consider source0 of the first 'MAC': (DA2,BT,U7). The brackets mean that the operand is in memory (indirect addressing). DA2 is the pointer (indirect address) and BT is the operand type (which is, as a skilled artisan will appreciate, not the operand class as described herein). Thus, the example processor supports four types: BT (byte), WD (word), BV (byte vector=4 bytes) and WV (word vector=four 16-bit words). U7, in the example of FIG. 4, specifies an update register.

Advantageously, this is a more flexible scheme than the known auto-increment/decrement scheme, commonly used in Digital Signal Processors (DSPs). Thus, after the memory access, using the address in DA2, U7 is added to DA2, where U7 can be a positive or negative number.

In accordance with embodiments of the present invention, relative addressing of CPU internal registers is used within a program code loop to transition to different registers in each loop pass. In particular, register selection fields within instruction words contain codes for both absolute and relative addressing. Relative addressing 430 for a particular destination operand 430 is performed using instruction words that contain codes, say, for the next register (VN), a previous register or the same default register (VS) upon each transition around the loop. In this regard, programs or part of programs that perform the same operation(s) on multiple data, which are stored in multiple CPU internal registers, can be implemented as loops. Advantageously, this reduces the instruction memory space requirements. The cost savings are particularly significant in embedded applications with on-chip instruction memory.

Thus, and advantageously, a CPU is able to receive instructions that can address a register by confirming the register's address ('next' in the sequence, 'previous' in the sequence or the 'same') in relation to the register used the previous time for the same operand class (source1, source2, destination, . . . ).

In accordance with embodiments of the invention, the opcode fields that specify register numbers are allocated one or more reserved codes to support relative register addressing. For example, if the CPU has thirteen registers, the 4-bit register specification fields in the opcode will support three codes plus the thirteen registers (4 bits=16 codes).

These three codes are then used for relative register specifications, e.g. code '1' indicates the same register, code '2' indicates the next register in the sequence; and code '3' indicates the previous register in the sequence.

In this manner, instructions are now able to utilise either absolute addressing (R0, . . . , R12) or relative addressing (Rsame, Rnext, Rprevious) specifications for each register data operand.

In one embodiment of the present invention, relative addressing is applied relative to the same class of operand, for example, for 3-operand instructions using source-1, source-2 or destination. In this regard, Rnext may be used to specify the next register in the sequence. For example, if an instruction uses R2 as a source-1 register, and the next instruction with a source-1 operand specifies Rnext for source-1, then R3 will be used.

In one embodiment of the present invention, when the last (highest) register number has been reached (e.g. R12 in the above example), Rnext (or Rprevious) may be arranged to loop back to a first address (e.g. R0 in the above example). Similarly, if the relative addressing is reducing to a first address (e.g. R0 in the above example) Rnext (or Rprevious) may be arranged to loop back to a last address (e.g. R12 in the above example).

In one embodiment of the present invention, one or more of the above types of relative register specifiers (same, next, previous) may be used. In one embodiment of the present invention, one or more additional specifiers may be used, for example nextnext (n+2) or similar, as would be appreciated by a skilled artisan.

In one embodiment of the present invention, the microprocessor may be configured to update a register number, either before or after the register is used. For example, FIG. 1 illustrates an 'update before case. In one embodiment of the present invention, the update function may be located in step 130, with the operation:

RASR[OCLASS]=Fupd(RSPEC[OCLASS]

The use (register access) may be located in step 140, with the operation:

Access Register[RADDR]

It is envisaged that in other embodiments, the steps 130 and 140 may be performed in reverse order, with the only difference being the initialization value used, e.g. if a loop starts with R0 in a first pass, then for an 'update before' operation, the initial value is R12 (e.g. the last register of the aforementioned example), so that the first Rnext operation wraps the number to R0 for the first use. In the 'update after use' case, the initial value would be R0.

It will be understood that the improved microprocessor architecture and method for addressing therein, as described above, aims to provide at least one or more of the following advantages:

(i) The use of the aforementioned relative addressing mechanism permits a single looping code sequence to manipulate data in multiple registers. This means that loops do not need to be 'unrolled', thereby saving code space.

(ii) The aforementioned relative addressing mechanism when applied to microprocessor registers offers an advantage over absolute addressing in that the use of loops to process lists/arrays of register operands improves code density.

(iii) The inventive concept of the present invention finds particular application in digital signal processing and in particular image processing, where renaming of the next set of registers to allow the same code sequence to run on different registers is beneficial.

(iv) The inventive concept is easy to implement by software programmers.

It will be appreciated that any suitable distribution of functionality between different functional units may be used without detracting from the inventive concept herein described. Hence, references to specific functional devices or elements are only to be seen as references to suitable means for providing the described functionality, rather than indicative of a strict logical or physical structure or organization. Furthermore, the various components within the microprocessor architecture can be realised in discrete or integrated component form, with an ultimate structure therefore being merely an application-specific selection.

Aspects of the invention may be implemented in any suitable form including hardware, software, firmware or any combination of these. The elements and components of an embodiment of the invention may be physically, functionally and logically implemented in any suitable way. Indeed, the functionality may be implemented in a single unit or IC, in a plurality of units or ICs or as part of other functional units.

In particular, it is envisaged that the aforementioned inventive concept can be applied by a semiconductor manufacturer to any microprocessor architecture having an array of registers. It is further envisaged that, for example, a semiconductor manufacturer may employ the inventive concept in a design of a stand-alone device or application-specific integrated circuit (ASIC) and/or any other sub-system element.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality.

Thus, an improved microprocessor architecture and method for addressing therein have been described, wherein the aforementioned disadvantages with prior art arrangements have been substantially alleviated.

The invention claimed is:

1. A microprocessor architecture comprising:
a microprocessor including a plurality of registers that are internal to the microprocessor, the microprocessor arranged to execute a plurality of instructions that each use a respective first operand of a first operand class, and a respective second operand of a second operand class, each instruction of the plurality of instructions having a respective opcode that comprises:
a first field that indicates whether a first register address where its first operand is stored is to be determined using absolute addressing or using relative addressing with respect to an address of a previously accessed register of the first operand class; and
a second field that indicates whether a second register address where its second operand is stored is to be determined using absolute addressing or using relative addressing with respect to an address of a previously accessed register of the second operand class.

2. The microprocessor architecture of claim 1 wherein the one or more bit fields comprises an n-bit code used as a register specifier (RSPEC).

3. The microprocessor architecture according to claim 2 wherein one or more codes of the register specifier is/are reserved to support relative register addressing.

4. The microprocessor architecture according to claim 2 wherein the register specifier specifies another address relative to a last address accessed in a register array.

5. The microprocessor architecture according to claim 4 wherein specifying an address relative to the last address accessed comprises wrapping addresses to a first address or the last address in the register array.

6. The microprocessor architecture according to claim 1 wherein the class of operand encompasses one or more of the following: source-1, source-2, and destination.

7. An integrated circuit comprising the microprocessor architecture according to claim 1.

8. The microprocessor architecture according to claim 1 further comprising:
a first register associated with the first operand class, the first register to store the address of the previously accessed register of the first operand class, wherein the address of the previously accessed register of the first operand class stored in the first register is updated only by operands of the first operand class; and
a second register associated with the second operand class, the second register to store the address of the previously accessed register of the second operand class, wherein the address of the previously accessed register of the second operand class stored in the second register is updated only by operands of the second operand class.

9. A method for register addressing in a microprocessor architecture comprising a microprocessor including a plurality of registers that are internal to the microprocessor, the method comprising:
executing at least one instruction that each of the at least one instruction uses or generates a respective plurality of data operands including a respective first operand of a first operand class and a respective second operand of a second operand class;
determining based upon a respective first one or more bits of the instruction whether relative addressing or absolute addressing is used to determine register addresses, of the plurality of registers, for operands of the first operand class; and
determining based upon a respective second one or more bits of the instruction whether relative addressing or absolute addressing is used to determine register addresses, of the plurality of registers, for operands of the second operand class.

10. The method for register addressing of claim 9 wherein the one or more bits comprises an n-bit code used as a register specifier (RSPEC).

11. The method for register addressing according to claim 10 wherein the register specifier specifies another address relative to a last address accessed in a register array.

12. The method for register addressing according to claim 11 wherein specifying the another address relative to the last address accessed comprises wrapping addresses to a first address or the last address in the register array.

13. The method for register addressing according to claim 11 wherein specifying an address relative to the last address accessed comprises wrapping addresses to a first address or the last address in the register array.

14. The method for register addressing according to claim 10 further comprising: reserving one or more codes in the register specifier in an opcode word to support relative register addressing.

15. The method for register addressing according to claim 9 further comprising: reserving one or more codes in a register specifier in an opcode word to support relative register addressing.

16. The method for register addressing according to claim 15 wherein the register specifier specifies another address relative to a last address accessed in a register array.

17. The method for register addressing according to claim 15 wherein the class of operand encompasses one or more of the following: source-1, source-2, and destination.

18. The method for register addressing according to claim 9 wherein the class of operand encompasses one or more of the following: source-1, source-2, and destination.

19. A method for register addressing in a microprocessor architecture comprising a microprocessor including a plurality of registers that are internal to the microprocessor, the method comprising:

executing an instruction that uses a plurality of data operands including a first operand of a first operand class and a second operand of a second operand class;

determining based upon a first one or more bits of the instruction whether absolute addressing or relative addressing with respect to an address of a previously accessed register of the first operand class is used for a first register address where the first operand is stored; and determining based upon a second one or more bits of the instruction whether absolute addressing or relative addressing with respect to an address of a previously accessed register of the second operand class is used for a second register address where the second operand is stored.

20. The method of claim 19 wherein specifying an address relative to the last address accessed comprises wrapping addresses to a first address or the last address in the register array.

* * * * *